(12) United States Patent
Subak et al.

(10) Patent No.: US 6,304,188 B1
(45) Date of Patent: Oct. 16, 2001

(54) MODULAR SURGE SUPPRESSOR FOR A TRAFFIC CABINET

(75) Inventors: Mark J. Subak, Gainsville; Jimmy J. Hardage, Ocala, both of FL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/441,265

(22) Filed: Nov. 16, 1999

(51) Int. Cl.[7] .................................................. G08B 21/00
(52) U.S. Cl. ........................ 340/638; 340/635; 361/118; 361/731; 361/627; 361/641; 361/728
(58) Field of Search .................................. 340/638, 635, 340/649, 650; 361/641, 627, 728, 118, 731

(56) References Cited

U.S. PATENT DOCUMENTS

| 4,688,135 | * | 8/1987 | Leopold | 361/118 |
| 5,627,720 | * | 5/1997 | Lewis | 361/118 |
| 5,844,763 | * | 12/1998 | Grace et al. | 361/111 |
| 5,969,932 | * | 10/1999 | Ryan et al. | 361/118 |

* cited by examiner

*Primary Examiner*—Julie Lieu
(74) *Attorney, Agent, or Firm*—Howrey Simon Arnold & White, LLP

(57) ABSTRACT

A modular surge suppression system for a traffic cabinet. The system comprising a surge suppression module and a modular adapter connected to the circuitry in the traffic cabinet. The modular adapter being configured to connect with the surge suppression module.

38 Claims, 6 Drawing Sheets

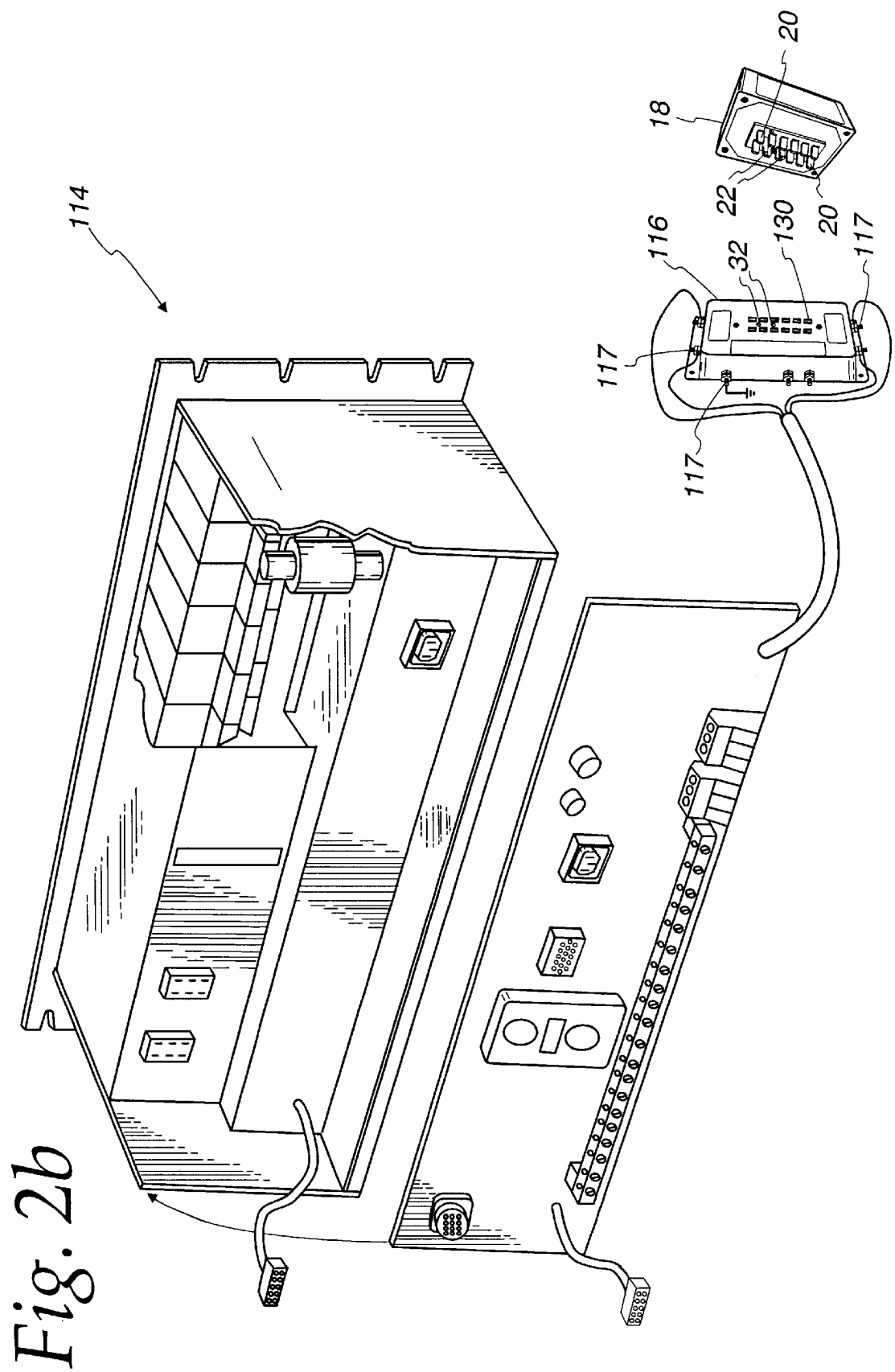

MODULAR SURGE SUPPRESSOR FOR A TRAFFIC CABINET

FIELD OF THE INVENTION

The present invention relates to surge suppression devices. More specifically, this invention relates to a modular surge suppressor and adapter for a traffic cabinet.

BACKGROUND OF THE INVENTION

Traffic control equipment (e.g., traffic lights) is controlled by electronic circuitry housed in traffic cabinets. This circuitry is subject to faults caused by overcurrent and/or overvoltage conditions such as lightning. To protect the traffic control circuitry from faults, surge suppression devices have been hard wired into traffic cabinets. This is a process that requires lugs on the surge suppression device to be individually wired to the power circuitry in the traffic cabinet. In the event of a fault that exceeds the maximum rating of the surge suppression device, the device would likely be damaged or destroyed. Consequently, the surge suppression device must be replaced. However, to replace a hard wired surge suppression device, the traffic control equipment has to be disabled, the traffic cabinet has to be opened, and the surge suppression device has to be unwired, removed and replaced with another device that has to be wired to the circuitry in the traffic cabinet. Disabling the traffic control equipment often requires police personnel to direct traffic while the surge suppression device is being replaced. Thus, the length of time required to change the surge suppression device effects the safety of the driving public by disrupting the orderly flow of traffic at intersections. It also impacts cities that have to expend police time on efforts such as directing traffic instead of other more pressing police matters.

Therefore, there is a need for a modular surge suppression device that is capable of being quickly replaced in a traffic cabinet while protecting the circuitry therein from faults caused by overcurrent and/or overvoltage conditions (e.g., lightning). The present invention thus provides a surge suppression system for use with new and existing traffic cabinets that is easy to install and replace and protects the circuitry therein from faults caused by current and/or voltage surges.

SUMMARY OF THE INVENTION

A modular surge suppression system for a traffic cabinet. The system comprising a surge suppression module and a modular adapter connected to circuitry in the traffic cabinet. The modular adapter being configured to connect with the surge suppression module.

DESCRIPTION OF THE FIGURES

The following figures form part of the present specification and are included to further demonstrate certain aspects of the present invention. The invention may be better understood by reference to one or more of these drawings in combination with the detailed description of specific embodiments presented herein.

FIG. 2b is a perspective view showing a power module retrofitted with a modular adapter and a surge suppression module according to another embodiment of the invention;

Figure 1:
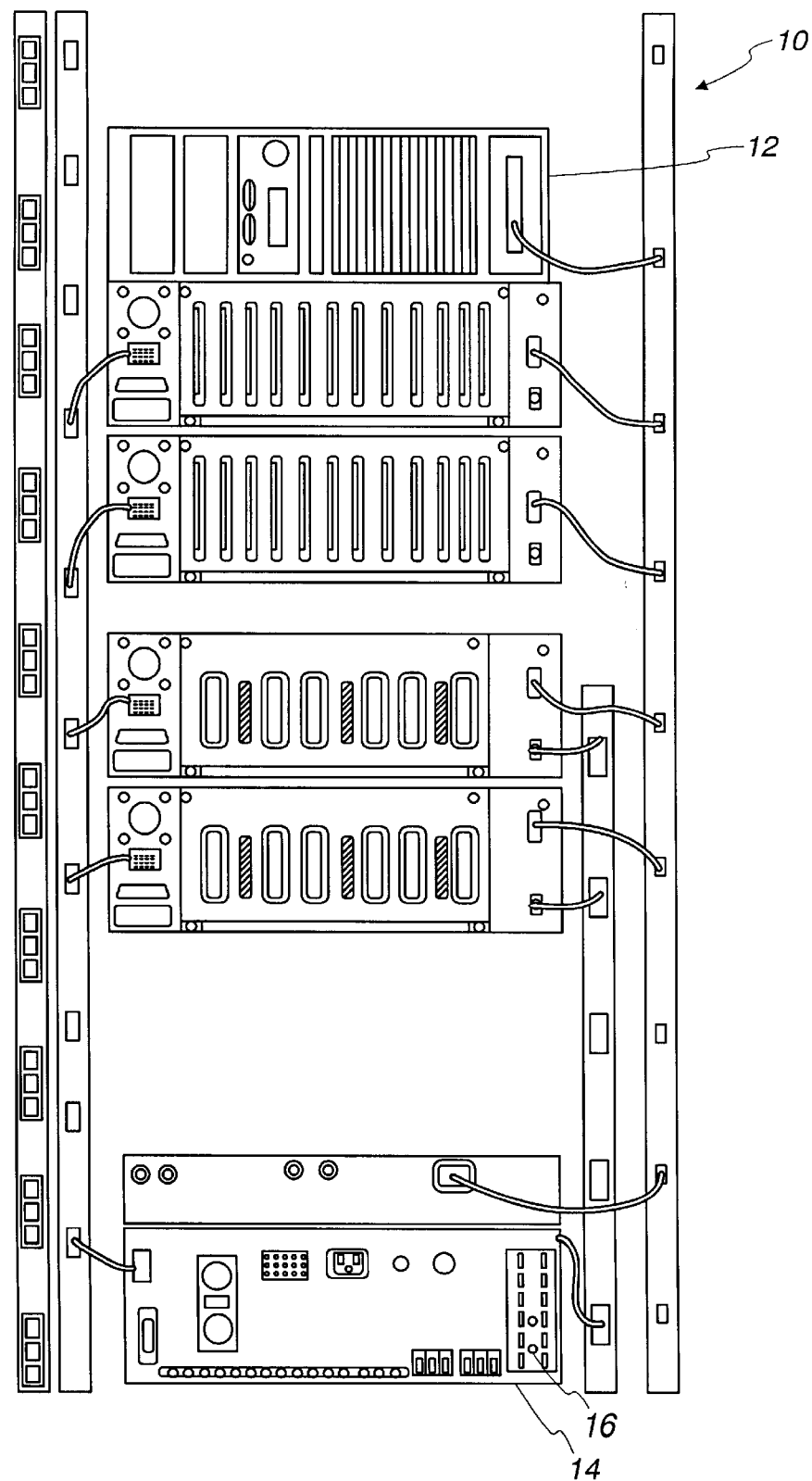
FIG. 1 is a rear view showing a traffic cabinet including a plurality of modules.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

Figure 2A:
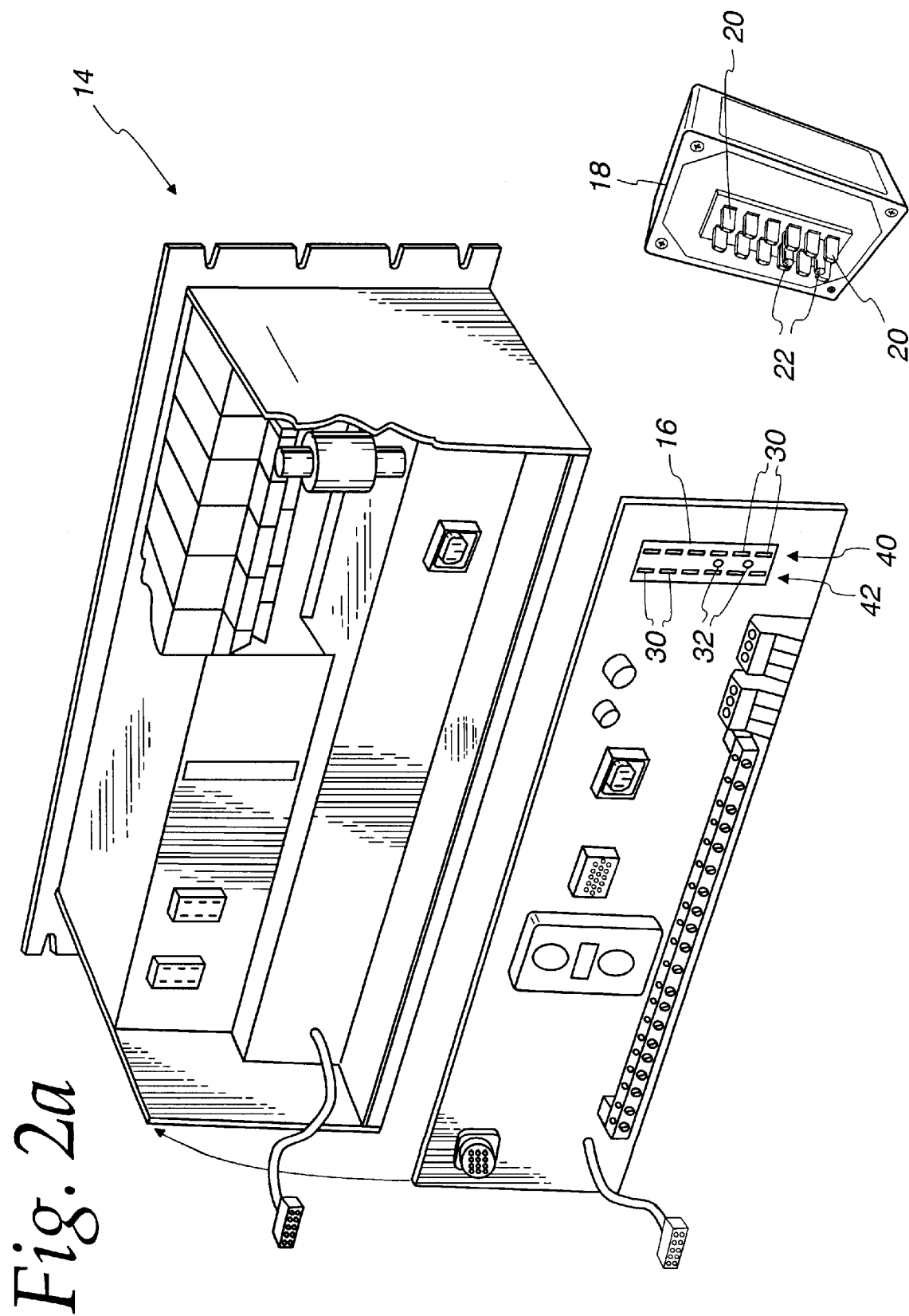
FIG. 2a is a perspective view showing a power module with an integrated modular adapter plug and a surge suppression module according to one embodiment of the invention.

The present invention provides surge suppression for new and existing traffic cabinets. A typical new traffic cabinet is a 170-type traffic cabinet which includes a standard 19" rack that houses a plurality of modules. The back of a new traffic cabinet 10 is shown in FIG. 1. The new traffic cabinet 10 is a VME controller cabinet including a VME controller module 12 (VME is a connectivity standard known in the art). The cabinet 10 includes a power distribution module 14, as shown in FIG. 1. On the back of the power module 14, a integrated modular adapter plug 16 is included. The plug 16 is configured to receive a surge suppression module 18, as shown in FIG. 2a. Having the plug 16 on the back of the power module 14 allows for quick and easy installation of surge suppression module 18.

Figure 3:
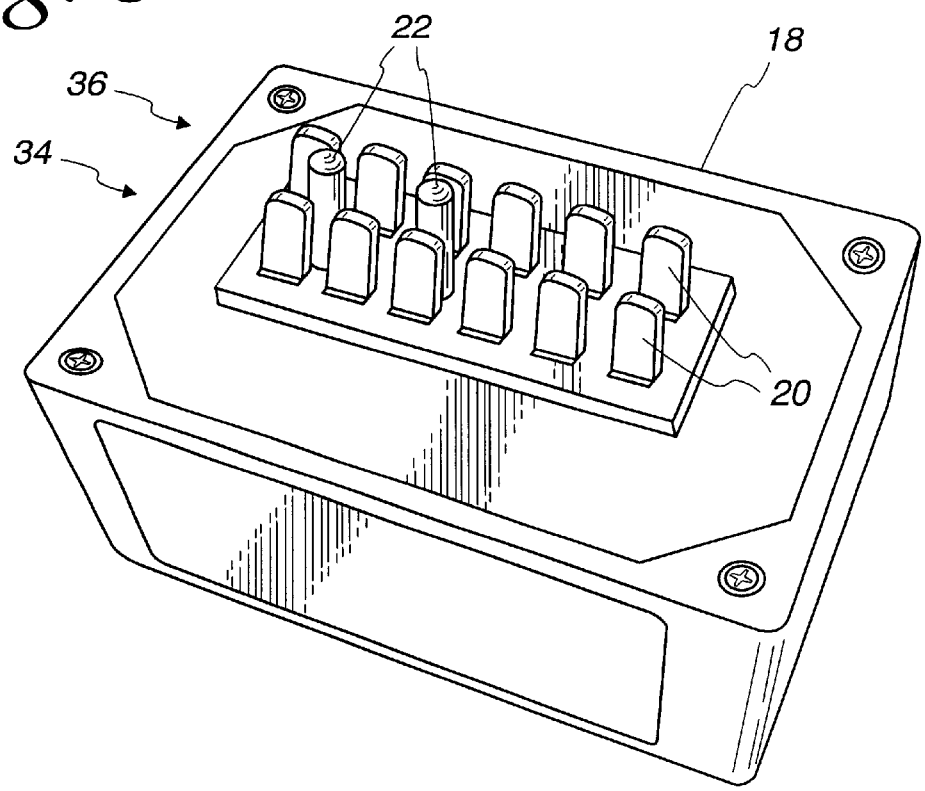
FIG. 3 is a perspective view showing a surge suppression module according to one embodiment of the invention.
Figure 5:
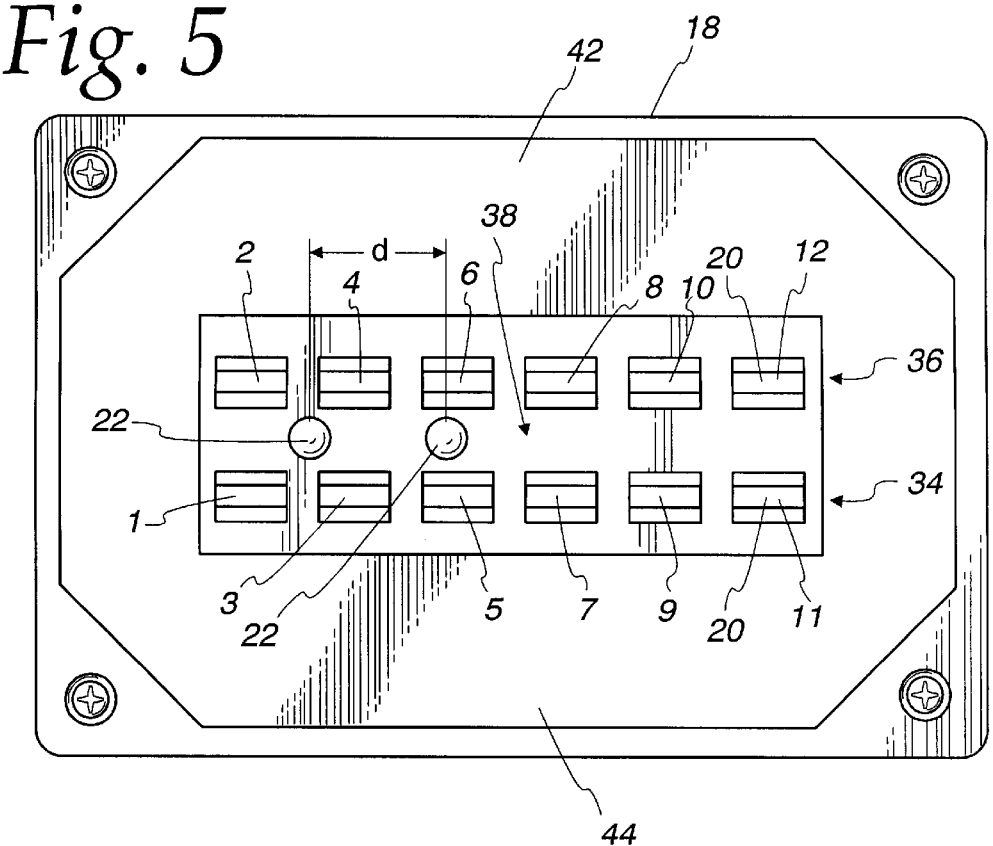
FIG. 5 is a bottom view showing the surge suppression module of FIG. 3.
Figure 7:
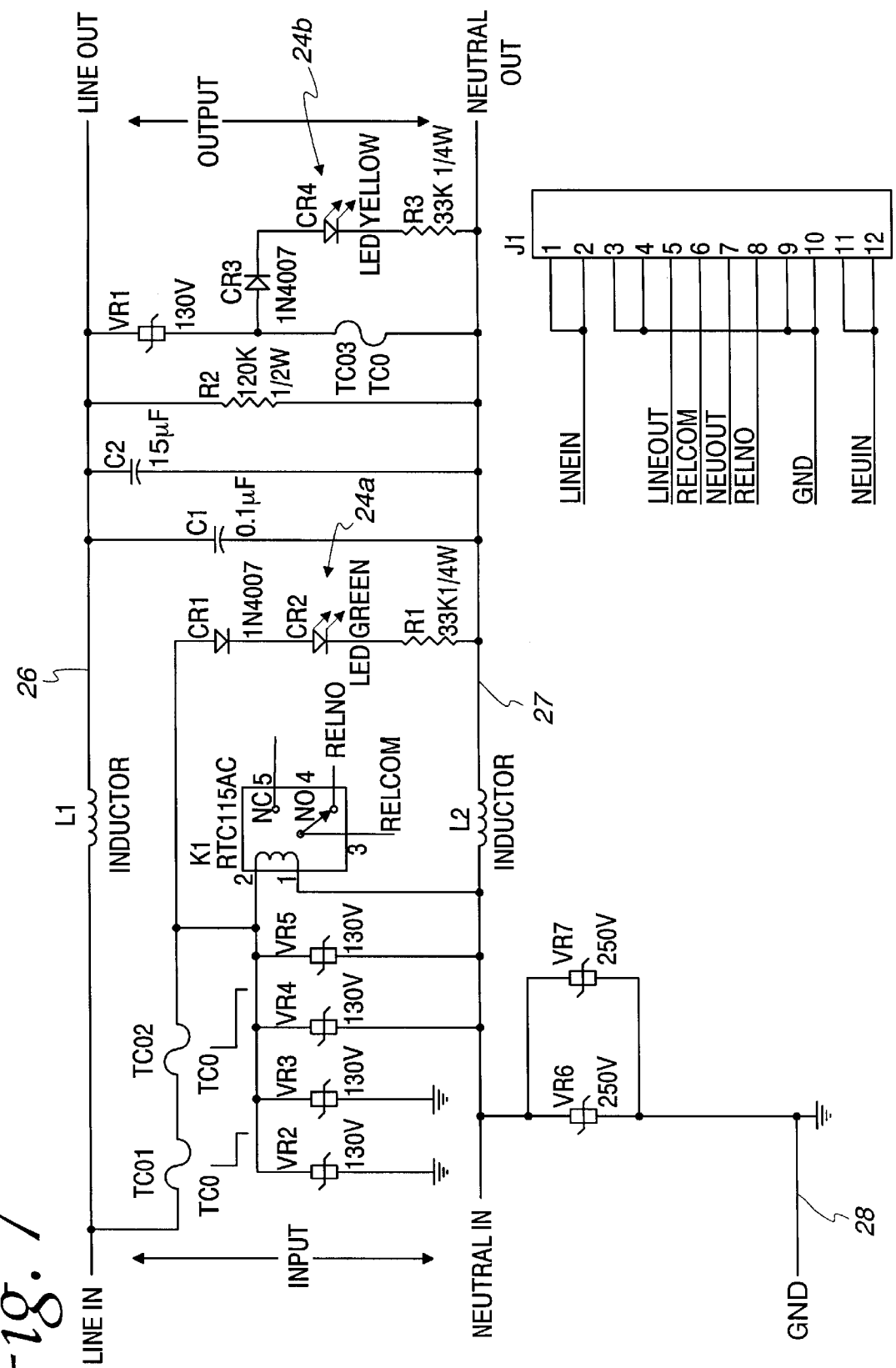
FIG. 7 is a schematic showing one embodiment of the surge suppression circuitry for the surge suppression module of FIG. 3.

In one embodiment, the surge suppression module 18 includes a plurality of contacts 20 that are arranged in a first row 34 and a second row 36 that are generally parallel to each other, as shown in FIG. 3. The first and second rows 34, 36 define therebetween a longitudinal space 38, as shown in FIG. 5. A pair of polarizing pins 22 are disposed in the longitudinal space 38 and arranged to prevent orientation errors during installation of the surge suppression module 18, as shown in FIGS. 3 and 5. In other words, the polarizing pins 22 prevent the module from being installed upside down with respect to the modular adapter plug 16. Instead, the pins 22 physically prevent the module 18 from being improperly installed. The two polarizing pins 22 may be disposed anywhere in the longitudinal space 38 and are spaced from each other by a distance d, as shown in FIG. 5. In one embodiment, the distance d=1.65 mm. However, the distance d between the polarizing pins 22 is a matter of design choice, as would be appreciated by one skilled in the art. In another embodiment, only one polarizing pin is included. So long as the one pin is not in the lengthwise center of the longitudinal space 38, the one pin, with a corresponding polarizing receptacle, will prevent orientation problems during installation. One embodiment of the surge suppression circuitry for the surge suppression module 18 is shown in FIG. 7. The surge suppression circuitry includes a main line 26 (line in, line out), a neutral line 27 (neutral in, neutral out) and a ground line 28 (GND). The pinout for the surge suppression module 18 is shown in the lower right corner of FIG. 7 (element J1). The circuit elements shown in the schematic of FIG. 7 are as follows: TCO=a Thermal Cut Off fusable link, VR=a Variable Resistor (or a Voltage Dependant Semiconductor), RTC=a Relay. The pins shown in the schematic of FIG. 7 are as follows: RELCOM=Relay Common, RELNO=Relay Normally Open, NC=Normally Closed, and NO=Normally Open.

The contacts 20 of the surge suppression module 18 are adapted to mate with corresponding mating contacts 30 on the modular adapter plug 16, as shown in FIG. 2a. Similarly, the polarizing pins 22 are adapted to mate with corresponding polarizing receptacles 32 on the modular adapter plug 16. The contacts 20 are male terminals that frictionally engage the inside surfaces of the mating contacts 30 which are female receptacles.

The modular adapter plug 16 includes two rows of the mating contacts 30, a first row 40 and a second row 42, as shown in FIG. 2a. The modular adapter plug 16 is electrically connected to power circuitry in the power module 14. Specifically, the modular adapter plug 16 is connected to the main line, the neutral line and the ground line of the power circuitry in the power module 14. The mating contracts 30 are configured to receive the corresponding contacts 20 and thus electrically connect the surge suppression module 18 to the main, neutral and ground lines of the power circuitry of the power module 14.

The module 18 plugs into the modular adapter plug 16 by aligning the polarizing pins 22 with the polarizing receptacles 32 and pushing the module 18 into the modular adapter plug 16 such that the contacts 20 each frictionally engage the mating contacts 30. Once the surge suppression module 18 is installed into the modular adapter plug 16, the contacts 20 of the module 18 are electrically connected with the power circuitry in the power module 14. The installed surge suppression module 18 reduces the effects of faults on the power circuitry.

Figure 4:
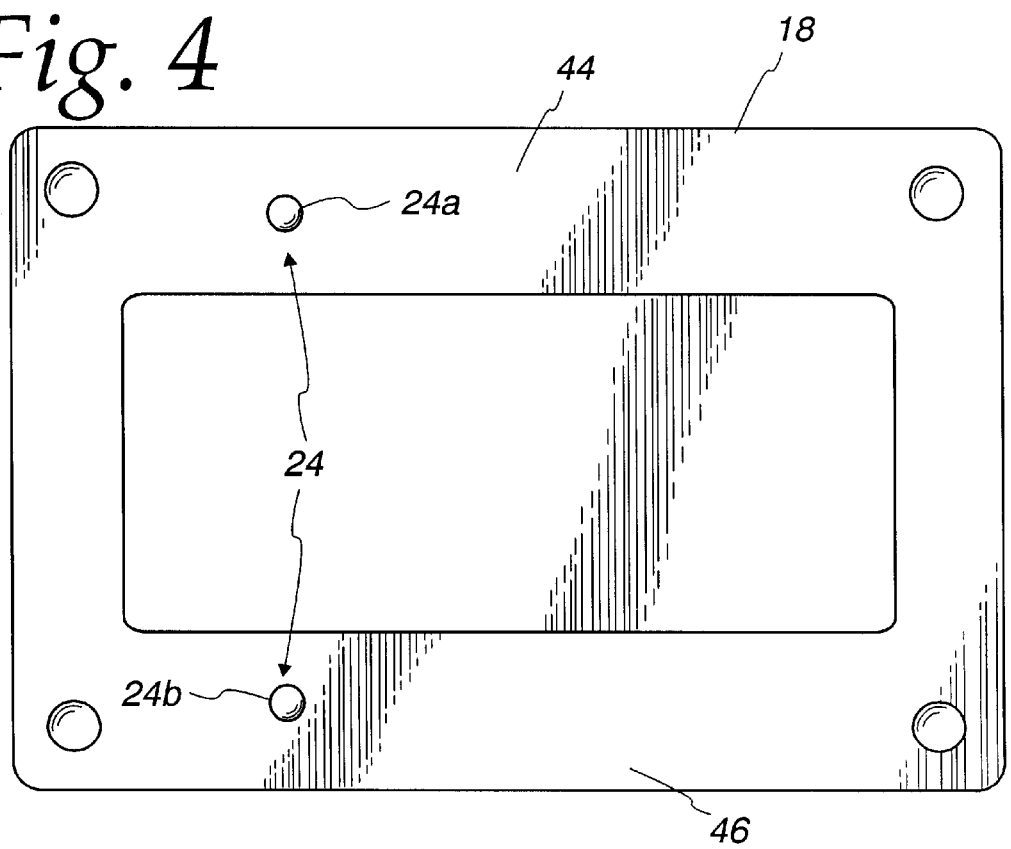
FIG. 4 is a top view showing the surge suppression module of FIG. 3.

The module 18 also includes a pair of indicator lights 24 for indicating whether or not a fault has occurred on either the primary side 44 or the secondary side 46 of the module 18, as shown in FIG. 4. The pair of indicator lights 24 include, e.g., a yellow light for indicating that a fault has occurred on the secondary side 46 and, e.g., a green light for indicating that no fault has occurred on the primary side 44. The green indicator light 24a and the yellow indicator light 24b are connected to the surge suppression circuitry as shown in FIG. 7. Alternatively, one indicator light could indicate that a fault has occurred or that no fault has occurred on the primary side, or that a fault has occurred or that no fault has occurred on the secondary side. The functionality of the module 18 can thus be checked by examining the indicator light(s) 24 on the module 18.

Referring to FIGS. 5 and 7, pins 6 and 8 of the surge suppression module 18 (the pinout of which is shown in the lower right corner of FIG. 7 as element J1) are connected to pins 3 and 4, respectively, of the relay K1 which is normally open. In the event of a fault, the relay closes (the switch moves from pin 4 to pin 5). Thus, connecting RELCOM pin 6 and RELNO pin 8 to a microprocessor having a modem allows the status of the module 18 to be monitored from a remote location.

Figure 6:
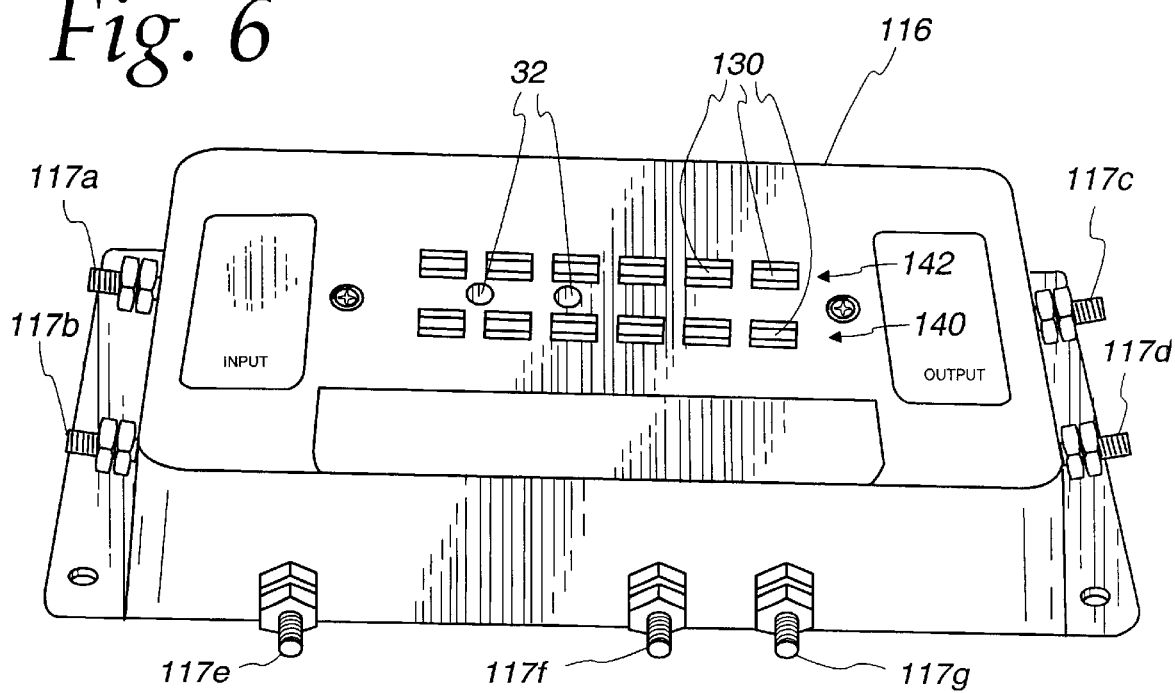
FIG. 6 is a perspective view showing the modular adapter of FIG. 2b.

The present invention also provides surge suppression for existing traffic cabinets. Existing traffic cabinets generally comprise a plurality of modules, including a power distribution module 114, as shown in FIG. 2b. However, contrary to the power module 14, the power module 114 does not include an integrated modular adapter plug 16. Thus, the power modules found in existing traffic cabinets have no modular connection for easily installing and replacing a surge suppression device. Therefore, according to another embodiment of the invention, the power module 114 is retrofitted to include a modular adapter 116 that is adapted to receive the surge suppression module 18. The modular adapter 116 includes a plurality of mating contacts 130 arranged in a first row 140 and a second row 142 that are generally parallel to each other, as shown in FIG. 6. The modular adapter 116 also includes bolt terminals or lugs 117 that are electrically connected to the first and second rows 140, 142 of mating contacts 130. The lugs 117 are hard wired to the power circuitry in the power module 114 such that the modular adapter 116 is connected to the main, neutral and ground lines of the power module 114.

Specifically, referring to FIGS. 2b and 6, the modular adapter 116 is connected between the main line and the neutral line of the power circuitry in the power module 114 by connecting the main line and the neutral line to two respective input lugs 117a, 117b. The main line and the neutral line of the power circuitry is also connected to two respective output lugs 117c, 117d. Lug 117e is connected to ground. Lugs 117f and 117g are configured to connect with diagnostic equipment (such as a microprocessor) to determine whether an installed module 18 is functional (i.e., no fault has occurred). Once the modular adapter 116 is wired into the power module 114, the surge suppression module 18 can be installed into the adapter 116, as described above, to provide surge protection to the existing traffic cabinet.

The microprocessor in the traffic cabinet typically includes a modem that allows the status of the module 18 to be monitored from a remote location. Referring to FIGS. 5 and 7, when a module 18 is installed into the adapter, pins 6 and 8 of the surge suppression module 18 (which are connected to pins 3 and 4, respectively, of the normally open relay K1, shown in FIG. 7) are electrically connected to the adapter lugs 117f and 117g. In the event of a fault, the relay closes (the switch moves from pin 4 to pin 5). Thus, the microprocessor connected to the lugs 117f and 117g can monitor the status of the module 18 and transmit that status to a remote location.

Therefore, the present invention provides a modular surge suppression device that is capable of being quickly replaced in a traffic cabinet while protecting the circuitry therein from faults caused by overcurrent and/or overvoltage conditions such as lightning. The surge suppression system of the present invention is capable of installation in new and existing traffic cabinets. The system is easy to install and replace and protects the circuitry in traffic cabinets from faults caused by current and/or voltage surges.

While the present invention has been described with reference to one or more embodiments, those skilled in the art will recognize that many changes may be made thereto without departing from the spirit and scope of the present invention which is set forth in the following claims.

What is claimed is:

1. A modular surge suppression system for a traffic cabinet, the system comprising:
    a surge suppression module having surge suppression circuitry and a plurality of contacts; and
    a modular adapter connected to circuitry in the traffic cabinet, the modular adapter having a plurality of mating contacts to enable the surge suppression module to plug into the adapter by mating the plurality of contacts of the surge suppression module to the mating contacts of the modular adapter;
    wherein the plurality of contacts of the surge suppression module comprises a main line in contact, a main line out contact, a neutral line in contact, a neutral line out contact, and a ground line contact.

2. The surge suppression system of claim 1, wherein the surge suppression module includes at least one polarizing pin.

3. The surge suppression system of claim 2, wherein the polarizing pin is adapted to mate with a corresponding polarizing receptacle on the adapter.

4. The surge suppression system of claim 1, wherein the plurality of contacts further includes at least one switch contact and the surge suppression circuitry of the surge suppression module includes a switch capable of being electrically connected to the at least one switch contact to enable the surge suppression module to be monitored for a fault.

5. The surge suppression system of claim 1, wherein the contacts are arranged in a first row and a second row that are generally parallel to each other.

6. The surge suppression system of claim 1, wherein the surge suppression module includes an indicator light for indicating a fault.

7. The surge suppression system of claim 1, wherein the modular adapter is hard wired into the traffic cabinet.

8. The surge suppression system of claim 7, wherein the modular adapter includes bolt terminals for hard wiring the modular adapter to the circuitry in the traffic cabinet.

9. A modular adapter for a surge suppression module used in a traffic cabinet, the adapter comprising:
a plurality of mating contacts that are electrically connected to circuitry in the traffic cabinet, the modular adapter being configured to receive a plurality of contacts of the surge suppression module, the plurality of contacts comprises a main line in contact, a main line out contact, a neutral line in contact, a neutral line out contact, and a ground line contact.

10. The modular adapter of claim 9, wherein the modular adapter has at least one polarizing receptacle.

11. The modular adapter of claim 10, wherein the at least one polarizing receptacle is adapted to mate with at least one corresponding polarizing pin.

12. modular adapter of claim 11, wherein at least one of the plurality of contacts being a fault indicator contact, the surge suppression module having a switch capable of being electrically connected to the at least one fault indicator contact to enable the surge suppression module to be monitored from a remote location.

13. The modular adapter of claim 9, wherein the modular adapter is hard wired into the traffic cabinet.

14. The modular adapter of claim 13, wherein the modular adapter includes bolt terminals for hard wiring the modular adapter to the circuitry in the traffic cabinet.

15. The modular adapter of claim 14, wherein the bolt terminals are electrically connected to the mating contacts.

16. A surge suppression module for mating with a modular adapter in a traffic cabinet, the module comprising:
a plurality of contacts and at least one polarizing pin, the contacts being adapted to mate with corresponding mating contacts on the adapter, the at least one polarizing pin being adapted to mate with a corresponding polarizing receptacle on the adapter;
wherein the plurality of contacts of the surge suppression module comprises a main line in contact, a main line out contact, a neutral line in contact, a neutral line out-contact, and a ground line contact.

17. The surge suppression module of claim 16, wherein the plurality of contacts further includes a fault indicator contact, the surge suppression module having a switch capable of being electrically connected to the fault indicator contact to enable the surge suppression module to indicate a fault to a remote location.

18. The surge suppression module of claim 16, wherein the contacts are arranged into a first row and a second row that are generally parallel to each other.

19. The surge suppression module of claim 18, wherein the at least one polarizing pin is disposed between the first and second rows of contacts.

20. The surge suppression module of claim 16, further including two polarizing pins.

21. The surge suppression module of claim 16, further including an indicator light.

22. The surge suppression module of claim 16, wherein the surge suppression module plugs into the adapter.

23. The surge suppression system of claim 16, wherein the modular adapter is hard wired into the traffic cabinet.

24. The surge suppression system of claim 23, wherein the modular adapter includes bolt terminals for hard wiring the modular adapter to circuitry in the traffic cabinet.

25. A modular adapter for a surge suppression module used in a traffic cabinet, the adapter comprising:
a plurality of mating contacts and at least one polarizing receptacle, the contacts being electrically connected to circuitry in the traffic cabinet, the adapter being configured to mate with corresponding contacts on the surge suppression module, the at least one polarizing receptacle being adapted to mate with at least one corresponding polarizing pin, at least one of the plurality of mating contacts being a fault monitoring mating contact, the surge suppression module having a switch capable of being electrically connected to the at least one fault monitoring mating contact to enable the surge suppression module to be monitored from a remote location.

26. The modular adapter of claim 25, wherein the mating contacts include a first row and a second row that are generally parallel to each other.

27. The modular adapter of claim 25, wherein the modular adapter is hard wired into the traffic cabinet.

28. The modular adapter of claim 25, wherein the modular adapter includes bolt terminals for hard wiring the modular adapter to the circuitry in the traffic cabinet.

29. The modular adapter of claim 28, wherein the bolt terminals are electrically connected to the contacts.

30. The modular adapter of claim 25, wherein the traffic cabinet includes a power module, the modular adapter being an integral plug disposed on the power module.

31. A method of installing a surge suppression module in a traffic cabinet comprising:
providing the traffic cabinet with a modular adapter connected to circuitry in the traffic cabinet, the modular adapter having a plurality of mating contacts; and
plugging the surge suppresion module into the adapter, the s module having a plurality of contacts that are adapted to mate with the plurality of mating contacts of the moduklar adapter, the plurality of contacts of the surge suppression module comprising a main line in contact, a main line out contact, a neutral line in contact, a neutral line out contact, and a ground line contact.

32. The method of claim 31, wherein the surge suppression module includes a polarizing pin and the adapter includes a polarizing receptacle, further including aligning the polarizing pin with the polarizing receptacle to properly orient the module during connection to the adapter.

33. The method of claim 31, further including hard wiring the modular adapter into the traffic cabinet.

34. The method of claim 31, wherein the traffic cabinet includes a power module, the modular adapter being an integral plug disposed on the power module.

35. The method of claim 31, wherein the surge suppression module further has a switch and a fault indicator contact, the switch of the surge suppression module capable of being electrically connected to the fault indicator contact and the method further comprising activating the switch during a fault.

36. A traffic cabinet for controlling traffic lights, the traffic cabinet comprising:

a traffic controller module;

a power module electrically connected to the traffic controller module, the power module having an adapter plug, the adapter plug having a plurality of mating contacts; and a removable surge suppression module having surge suppression circuitry and a plurality of contacts adapted to mate with the plurality of mating contacts of the adapter plug, the plurality of contacts of the surge suppression module comprising a main line in contact, a main line out contact, a neutral line in contact, a neutral line out contact, and a ground line contact.

37. The traffic cabinet of claim 36, wherein the surge suppression module further has at least one switch contact, the surge suppression circuitry of the surge suppression module has a switch capable of being electrically connected to the at least one switch contact to enable the surge suppression module to indicate a fault to a remote location.

38. A traffic cabinet for controlling traffic lights, the traffic cabinet comprising:

a traffic controller module;

a power module electrically connected to the traffic controller module, the power module having an adapter plug, the adapter plug having a plurality of mating contacts; and a removable surge suppression module having surge suppression circuitry and a plurality of contacts including a first switch contact and a second switch contact adapted to mate with the plurality of mating contacts of the adapter plug, the surge suppression circuitry of the surge suppression module having a switch to enable the surge suppression module to be monitored from a remote location, the switch capable of contacting the first switch contact and the second switch contact, the switch contacting the first switch contact during normal operations, the switch contacting the second switch contact during a fault.

* * * * *

UNITED STATES PATENT AND TRADEMARK OFFICE
CERTIFICATE OF CORRECTION

PATENT NO.    : 6,304,188 B1
DATED         : October 16, 2001
INVENTOR(S)   : Mark J. Subak and Jimmy J. Hardage It is certified that error appears in the above-identified patent and that said Letters Patent is hereby corrected as shown below:

Column 5,
Line 41, add -- The -- before "modular adapter".
Line 41, delete "11" insert -- 9 --.
Line 64, delete "–" after "out" insert -- --.

Column 6,
Line 54, delete "s" insert "surge suppression".
Line 56, delete "moduklar" insert -- modular --.

Signed and Sealed this

Thirtieth Day of July, 2002

*Attest:*

JAMES E. ROGAN
*Director of the United States Patent and Trademark Office*

*Attesting Officer*